March 29, 1932. M. H. KEATING ET AL 1,851,847
TROUGH
Filed April 30, 1928  2 Sheets-Sheet 1
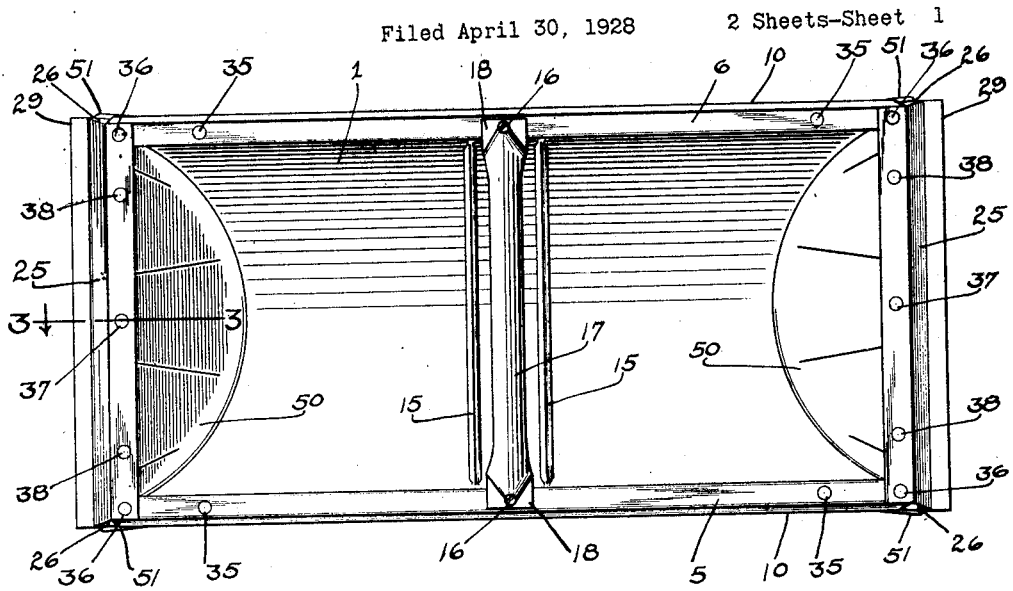
FIG. 1
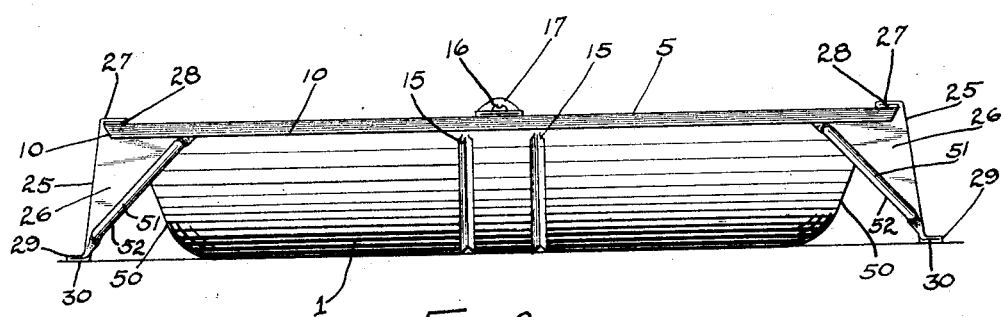
FIG. 2
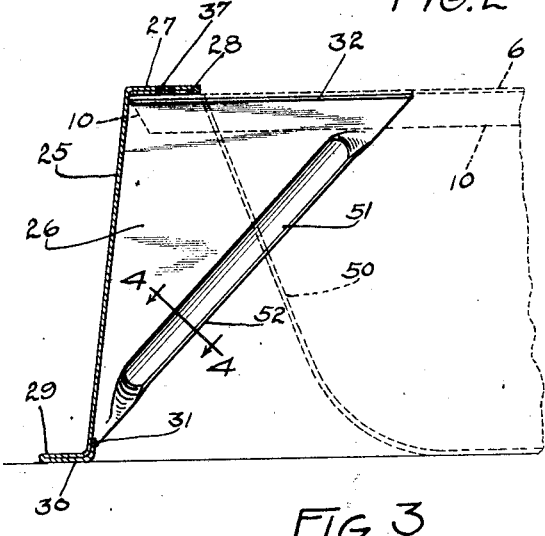
FIG. 3
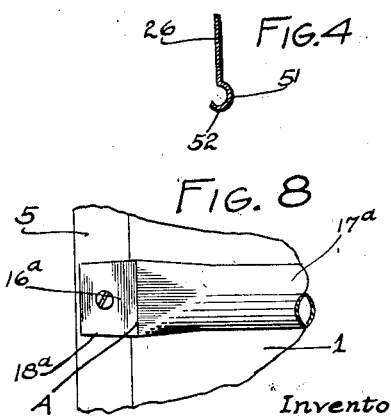
FIG. 4
FIG. 8
Inventors
MAURICE H. KEATING
ANTON W. KEGLER
By
Attorneys March 29, 1932.  M. H. KEATING ET AL  1,851,847
TROUGH
Filed April 30, 1928   2 Sheets-Sheet 2
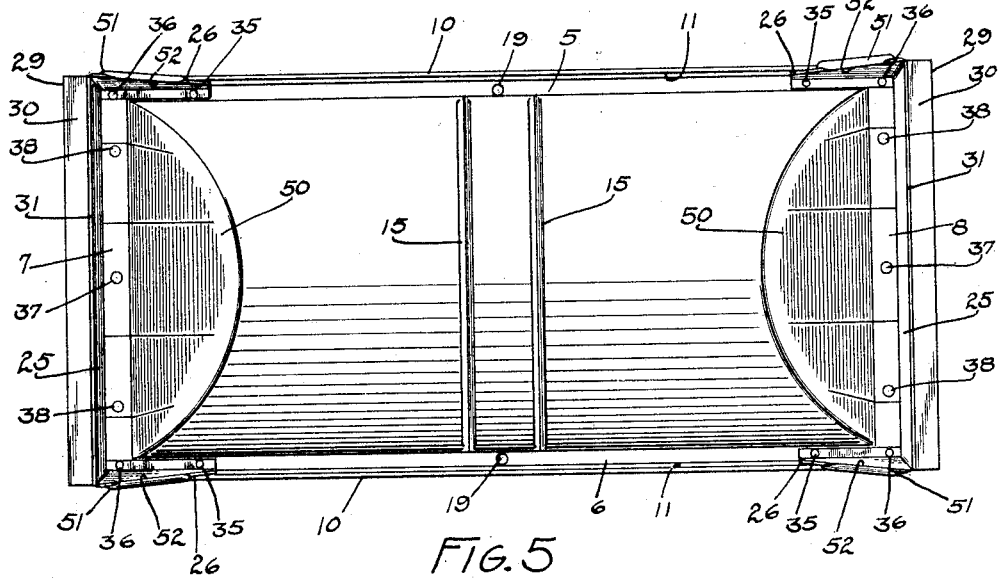
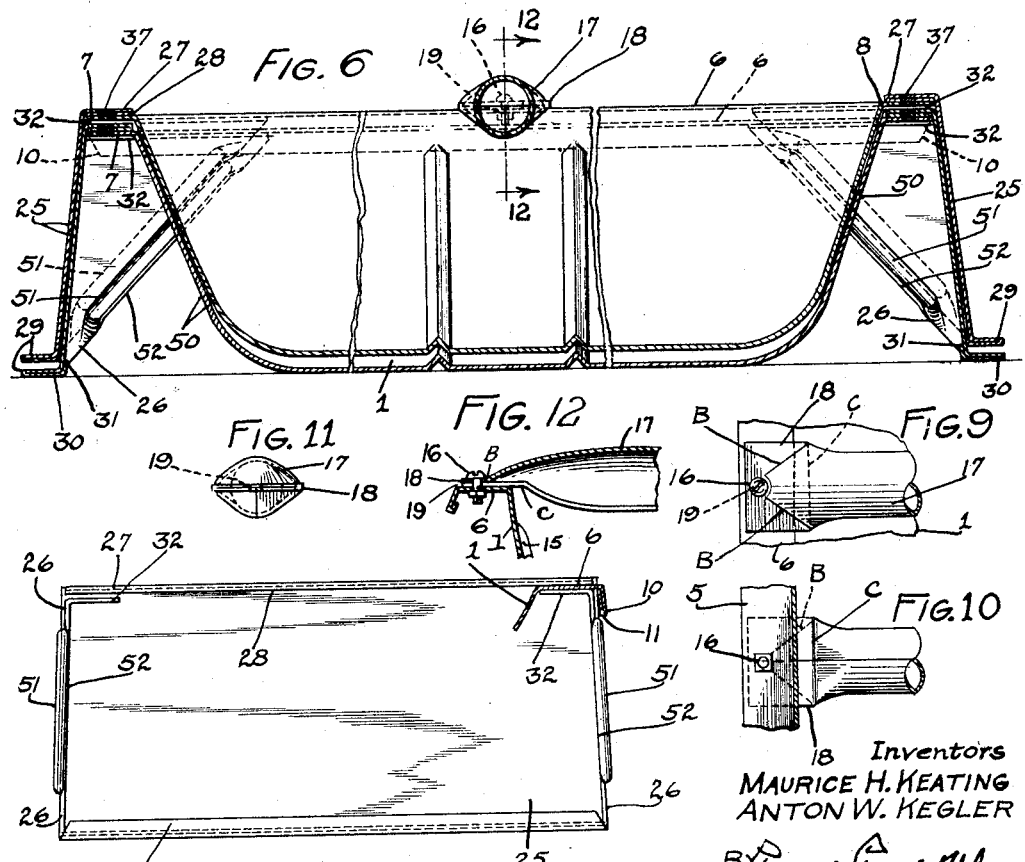
Inventors
MAURICE H. KEATING
ANTON W. KEGLER
Attorneys Patented Mar. 29, 1932

1,851,847

UNITED STATES PATENT OFFICE

MAURICE H. KEATING AND ANTON W. KEGLER, OF MINNEAPOLIS, MINNESOTA, ASSIGNORS TO H. D. HUDSON MANUFACTURING COMPANY, OF MINNEAPOLIS, MINNESOTA, A CORPORATION OF MINNESOTA

TROUGH

Application filed April 30, 1928. Serial No. 274,131.

This invention relates to improvements in hog troughs generally of the type illustrated in my copending application, Serial Number 206,576 of July 18th, 1927, and shows an improvement over the cited application.

A general object of the present invention is to provide a cheap, easily attached and rigid supporting means, which can be made by stamping, and with the shape and arrangement such as to permit of nesting of the troughs. Other objects are to provide reinforcement for the trough to prevent deformation at a point intermediate the ends; to provide a form of handle for the trough which will not be easily deformed or bent by downward pressures; to provide a form of reinforcement for the intermediate portion of the trough which will perform its function and yet will not interfere with the proper cleaning of the interior of the trough; to produce a trough which virtually consists of only three pieces of stamped or pressed metal, whereby the cost of manufacture and assembly is greatly reduced; and to attach the leg to the trough by welding, but to provide a construction such that no welding is used at points on the body portion of the trough. If welds are made on the body portion and if the legs are submitted to undue pulling strains, and the legs pulled off, the metal of the body often adheres to the leg, and holes are formed in the body. Therefore, in this invention there are no welding connections with the liquid containing portion of the trough.

A feature is the attachment of the leg at the end of the receptacle in a manner to permit nesting of the receptacles, the arrangement herein being such that the legs are substantially three sided with the sides divergent toward the bottom of the trough, thus also increasing the efficiency of the legs to prevent overturning of the trough.

Features of the invention include the broad idea of attaching legs to the trough only at points other than the liquid containing portion of the trough; the arrangement of a three sided leg at the end of the trough; the arrangement to permit nesting of the troughs and legs; the provision of an intermediate reinforcing means upstanding at the interior of the trough, providing an arrangement whereby the trough can be easily cleaned; the provision of a handle construction for the trough which withstands deformation particularly when the force is applied at the top of the trough; and the manner of connecting the handle.

Advantages of the invention will be set forth in the description of the drawings forming a part of this application, and in said drawings Figure 1 is a top plan of the trough constructed in accordance with this invention;

Figure 2 is a side elevation of the same;

Figure 3 is an enlarged detailed section on line 3—3 of Figure 1;

Figure 4 is a detailed section on line 4—4 of Figure 3;

Figure 5 is a bottom plan;

Figure 6 is a longitudinal sectional view showing the nesting relation of two troughs, and illustrating that the handle can be removed when nesting;

Figure 7 is an inside face view of one of the legs with the leg in a vertical position, as when attached, and showing a portion of the trough in section;

Figure 8 is a fragmentary top plan showing an old form of handle, and the manner of connecting it to a receptacle, and is illustrated for purposes of comparison with the new form of handle shown in Figures 9 and 10;

Figure 9 is a fragmentary top plan showing the end formation of the improved handle herein, and its manner of attachment;

Figure 10 is a view similar to Figure 9 but viewing the handle from beneath; and Figure 11 is an end view of the detached handle.

Figure 12 is a longitudinal section illustrating the handle brace and its relation to the trough and trough flange and also showing the relation of the strengthening ribs to the handle and to its point of attachment with the trough.

The construction of the trough proper forms no part of the present invention, and therefore this construction is not referred to in detail. However, the trough comprises a body portion 1 having ends slanting in the opposite direction with their surfaces convergent downwardly. The trough is substantially semi-circular in transverse section, although a transverse sectional view has not herein been shown. The trough is composed of one piece of metal and provides short horizontal flanges on all sides at the top. The longitudinal flanges are indicated at 5—6 and the end flanges are indicated at 7—8. The longitudinal flanges are provided with downwardly and outwardly flared lips or flanges as stiffeners, these lips being indicated at 10. The flare is to permit nesting. This is a feature of the invention. The end flanges 7 and 8 may be flared but are preferably formed as shown in Figure 6. The flanges 5—6 are rebent as at 11, to stiffen them, see Figure 7. The flanges 10 extend the full length of the body portion, as well as the full width of the end flanges, see dotted lines in Figure 6 and also in Figures 1 and 2. Inasmuch as the trough is formed from a single piece of metal, a single continuous circumscribing flange is provided.

The body portion is reinforced intermediately and substantially symmetrically at each side of and adjacent the longitudinal middle, by a pair of ribs 15 which project inwardly as clearly shown in Figure 6. Two ribs are used to obtain the proper stiffness and it has been found that the two ribs arranged substantially in the position shown give the best results. It has further been found that two ribs of substantially the size shown are best, giving a maximum strength, with a minimum of size. This is a feature of the invention, as well as the relative arrangement of ribs and handle.

Arranged across the longitudinal middle and detachably secured by bolts 16 to flanges 5 and 6 is a handle. This handle or brace is formed from a single piece of metal and is bent to provide a central cylindrical handle portion 17, and terminal flat attaching portions 18. Each flat terminal portion has an opening 19 through which the bolts 16 project to secure the handle to the flanges, or trough body. The construction of this handle or brace and its mode of attachment are features of this invention. To understand just what has been accomplished it is necessary to show how the flat terminal portions were previously formed. This is shown in Figure 8 and it will be seen that these portions have been flattened by applying pressure along a straight line A, at right angles to the axis of the handle. Moreover, these straight lines of emergence or division between the plane and curved surfaces on both sides were at the same distance from the opening for the fastening device, that is they were in the same cross-sectional plane. When the handle was attached, this line was disposed at a point laterally of the surface against which the flat portions engaged, see Figure 8, and therefore were arranged over the receptacle without any support whatever. Moreover, the die pressure along line A weakened the metal at this point so that if considerable weight, such as that of a pig, was applied, the bar was bent downwardly, and often fracture occurred. Moreover, if the bar was repeatedly bent downwardly and then pulled upwardly to straighten it, the same result was forthcoming. Figure 11 shows an end view of the handle or brace detached, and it will be seen that this flattened portion is of double thickness. The seam is on the bottom of the bar. This invention provides a construction of handle by which reinforcement at point of mergence between the cylindrical and flat portions is obtained. Instead of a single straight line at right angles to the axis being formed, this line is extended, see Figure 9, up to or adjacent the opening of the fastening device and is substantially of elliptical or triangular form with the apex adjacent the attaching opening, and the base overlying the receptacle. This elliptical or triangular line is indicated at B and is arranged only at the top side of the handle. Therefore, this reinforcement overlaps the surface to which the flattened portion is attached. Thus when pressure is applied to the handle from above, the outermost reinforcing portion of the triangular reinforcement assists materially in preventing that sufficient inward or downward deformation which will cause fracture. It will further be noted that this reinforcing extension is not provided on the lower part of the handle, so that the flattened portion may engage flatly against the surface to which it is attached. On the bottom the straight line C is formed at point of emergence, which line lies at right angles to the axis as in the old form, see Figure 10.

Another feature of the invention is the construction of the foot or support, see Figures 3 and 7. Each trough has two of these feet, one attached transversely at each end. Each foot is formed from a single sheet of material and is three sided, and therefore provides an end wall 25 and two side walls 26. The wall 25 has an upper horizontal flange 27, bent upon itself as at 28 to obtain reinforcement. The lower end of the side 25 has an outwardly bent foot portion 29, rebent as at 30 to provide reinforcement, and then bent upwardly as at 31 against the inner face of the side 25, thus disposing the raw edge of the metal, to prevent injury to those handling the device. Each side 26 has a horizontal flange 32, and these flanges are bent inwardly towards one another as most clearly shown in Figure 7. The flanges 32 lie, in this instance, in a plane below the flange 27 and are opposed thereto, to receive therebetween the side and end flanges 5 and 6, 7 and 8, of the trough. If the flange at the top of the receptacle is considered continuous then this flange lies between the flanges 27—32 of the foot. After assembly the elements are secured together by spot welding. Welds are made at 35 to secure flanges 32 to flanges 5 and 6. Corner welds 36 secure flanges 27, 5 and 6, and 32, and therefore each connects three flange elements. Central welds 37 are also used, as well as welds between the welds 36 and the central welds, these latter being numbered 38, and preferably being located nearer the welds 36 than welds 37.

Another feature of the invention is the arrangement of the walls 25—26 relative to the end wall 50 of the body, so that the devices can be nested, as shown in Figure 6. For this purpose it will be seen that the walls 25 and 26 are divergently flared in a downward direction or towards the bottom of the receptacle, the end walls 50 of the receptacle being correspondingly flared as shown. When flanges 10 are used they are correspondingly flared downwardly and outwardly as shown.

Another feature of the invention included in the leg structure, is the reinforcement indicated at 51 and most clearly shown in Figures 3 and 4. This reinforcement is accomplished by turning the respective slanting edges of the sides 26 substantially in the manner shown in Figure 4. It will be noted that the lower portion 52 is thus made smoother, so that it will not cut the hands when portions 26 are grasped. This is a valuable feature of the invention, and the reinforcing means 51 is angularly related so that a natural grip can be had in lifting.

It will be noted that the terminals of the ribs do not extend to the level of the bend line between horizontal marginal flanges and the cross-sectionally semi-circular trough body. That these terminals do not extend to the bend point of the flange with the receptacle, constitutes a feature of this invention. It has been found, when reinforcing ribs are extended to merge into the bend line of the flange with the body, that when the trough is bent downwardly fracture occurs at this point or these points of emergence. On the other hand when the end portions of the ribs terminate short of the flange and body bend-line, fracture does not occur at those points.

It will be understood that among the objects of this invention are: to provide a trough which can be easily cleaned and therefore be kept in a sanitary condition; to provide a trough which can nest and which at the same time provides an unusually rigid body and leg structure; to provide a structure in which there are no raw metal edges which can injure those who handle the trough or the animals that use it; to provide reinforcement and so arrange it that the necessity for handle brace is eliminated, thus preventing the pigs from rooting under such brace and raising or moving the trough in a manner to force other pigs to abandon it; and, as before mentioned, to provide a trough in which there are no exposed cutting edges that is in which all edges are turned and therefore rounded to prevent injury to those handling or using the trough.

The ribs 15 act on small troughs alone, that is without the use of the handle brace 17, to strongly resist transverse crimping of the flanges and spreading of the tank at the intermediate portion. One of the reasons that these ribs act in this manner is that they stop some distance short of the flange. If the rib extended up to the bend line of the flange with the tank wall there would be a crimping action, (under vertical stress), weakening the metal and lessening its resistance to a load applied downwardly against the trough, as when the animals are stepping or lying on the trough.

In regard to the bracing feature which includes the handle 17, the bend point C substantially coincides with the inner edge of the receptacle or flange, as shown in Figure 12, and the top tubular portion extends outwardly to reinforce the flattened portion and to lie above and in opposition to the flange or to that portion of the receptacle which extends outwardly.

We claim as our invention:

1. A trough having a circumscribing horizontally arranged marginal flange at its top, a three-sided foot having flanges engaging the trough flange, one transversely of the trough at the end and the other two longitudinally thereof one at each side, the foot flanges engaging at opposite sides of the trough flange and all flanges being secured together, the securing connection between the flanges forming the sole connection of the foot with the trough.

2. A trough having flanges, a three sided leg having flanges engaging the trough flanges, one upon the top of the trough flange and the others below the trough flange.

3. A cross-sectionally segmental arcuate trough having upper marginal flanges which are bent at an angle to the wall of the trough, and a rib embossed in the material of the wall and extending transversely between the flanges, the terminals of said rib extending to a point adjacent but not reaching the bend line between the flanges, and trough walls.

4. A trough marginally flanged, two legs for said trough, each having flat end portions and two integral flat side portions, the end portion having its flat portion opposed to the corresponding end of the trough and the side portions having their flat portions opposed to the corresponding sides of the trough, and means connecting the upper portions of said end and side portions of the legs to the corresponding flanges of the trough.

5. A trough provided with two supporting legs disposed at the ends of the trough, each leg formed of two flat side portions connected to each other by an intermediate flat end portion, the end portion and also the two side portions of each leg being secured respectively to be corresponding end and sides of the trough.

6. A trough provided with two supporting legs disposed at the ends of the trough, each leg formed of two flat side portions connected to each other by an intermediate flat end portion, the end portion and also the two side portions of each leg being secured respectively to the corresponding end and sides of the trough, each flat portion of the legs at the inner face thereof forming an obtuse angle with a plane parallel with the open side of the trough, and each wall of the trough at its outer face forming an obtuse angle with said plane, the flat portions of the legs and the sides and ends of the trough being divergent toward the bottom of the trough to form downwardly flaring spaces to permit nesting of one trough within another and its supporting legs to nest relatively to the legs of another trough.

In witness whereof, we have hereunto set our hands this 23rd day of April, 1928.

MAURICE H. KEATING.
ANTON W. KEGLER.